(12) United States Patent
Klein

(10) Patent No.: US 7,244,527 B2
(45) Date of Patent: Jul. 17, 2007

(54) MULTI-CELL BATTERY CHARGE CONTROL

(75) Inventor: Martin G. Klein, Brookfield, CT (US)

(73) Assignee: Electro Energy, Inc., Danbury, CT (US)

( * ) Notice: Subject to any disclaimer, the term of this patent is extended or adjusted under 35 U.S.C. 154(b) by 410 days.

(21) Appl. No.: 10/685,473

(22) Filed: Oct. 16, 2003

(65) Prior Publication Data

US 2005/0084754 A1 Apr. 21, 2005

(51) Int. Cl.
*H01M 6/00* (2006.01)
*H01M 4/00* (2006.01)
*H01M 2/16* (2006.01)

(52) U.S. Cl. ............... 429/122; 429/128; 429/142

(58) Field of Classification Search ........ 429/122, 429/128, 142
See application file for complete search history.

(56) References Cited

U.S. PATENT DOCUMENTS

| 5,026,615 A | 6/1991 | Tucholski |
| 5,405,715 A | 4/1995 | Dawson et al. |
| 5,609,972 A | 3/1997 | Kaschmitter et al. |
| 5,741,606 A | 4/1998 | Mayer et al. |
| 5,747,187 A | 5/1998 | Byon |
| 6,018,286 A | 1/2000 | Quinn et al. |
| 6,069,551 A | 5/2000 | Kalapodis et al. |
| 6,078,244 A | 6/2000 | Quinn et al. |
| 6,503,658 B1 * | 1/2003 | Klein et al. ............ 429/210 |
| 6,610,438 B2 | 8/2003 | Okumura et al. |
| 2002/0119364 A1 | 8/2002 | Bushong et al. |
| 2003/0072998 A1 | 4/2003 | Fredriksson et al. |

OTHER PUBLICATIONS

Liaw, et al., *Reliable Fast Recharge of Nickel Metal Hydride Cells, Solid State Ionics* 152-153 (2002), 217-225.
PCT International Search Report (PCT/US04/34296 dated May 5, 2006).

* cited by examiner

*Primary Examiner*—Dah-Wei Yuan
(74) *Attorney, Agent, or Firm*—Kenyon & Kenyon LLP

(57) ABSTRACT

Embodiments of the present invention provide a method and system for controlling a multi-cell battery. In one embodiment of the present invention, a stack of bipolar wafer cells may be connected in series. Each cell may have an area that may be expandable in response to pressure. Such an area may be aligned with a corresponding area of at least one adjacent cell. The invention further includes a trigger mechanism that may be responsive to a force created by pressure generated in a cell in the stack of bipolar cells.

31 Claims, 14 Drawing Sheets

MULTI-CELL BATTERY CHARGE CONTROL

This invention was made with government support under contract NA 00421-00-9-0446 awarded by the United States Navy. The government has certain rights in this invention.

TECHNICAL FIELD

The present invention relates to batteries. In particular, embodiments of the present invention provide a method and apparatus for controlling the charge and/or discharge of a stack of wafer electrochemical cells.

BACKGROUND OF THE INVENTION

Aqueous rechargeable batteries generate gas, at the conclusion of charge and during overcharge, after the active electrodes become fully charged. In a sealed cell and battery configurations, the rate of charge needs to be controlled to avoid excessive buildup of pressure within the cells that can cause cell rupture and damage. Alkaline rechargeable batteries of, for example, nickel, nickel cadmium, nickel zinc, nickel-iron and nickel metal hydride type may utilize cells in which excess negative anodic material is designed into the cell. In this configuration, oxygen gas may be generated on the surface of the nickel electrode at the end of charge before hydrogen starts to generate on the negative electrode.

The charge reaction of the Nickel electrode is

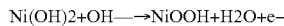

Ni(OH)2+OH—→NiOOH+H2O+e−

The evolution reaction of Oxygen is

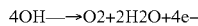

4OH—→O2+2H2O+4e−

The charge reaction of the Hydride electrode is:

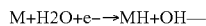

M+H2O+e−→MH+OH—

In a limited electrolyte cell design, the oxygen generated during overcharge can be recombined on the surface of the negative electrode avoiding excessive pressure buildup within the cell.

The recombination reaction of Oxygen on the Hydride electrode is:

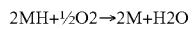

2MH+½O2→2M+H2O

The rate of recombination may be based on mass transport or kinetics in a sealed cell. For example, it may be dependent on the catalytic activity of the oxygen on the negative electrode and on the access of oxygen to the surface of the negative electrode. The rate of recombination may be pressure and/or temperature dependent. In typical cells, the steady state recombination may be limited to the five to ten hour charge rate. Furthermore, the overcharge recombination process can generate heat within the cells that may damage cell materials and lead to thermal runaway.

Therefore, many techniques have been developed to control and limit the charge of batteries to avoid excessive heating and/or damage from generation of excessive internal pressures. Techniques that are utilized to control charge include, for example, the monitoring and control of temperature, the rate of change of temperature and/or cell voltage, the rate of change of cell voltage and/or pressure, the rate of change of pressure, and/or any combination thereof. These techniques can be accurate for individual cells. Moreover, all of these above approaches utilize individual mechanisms in each cell and are directed to cylindrical and prismatic packaged cells. However, in a battery that is typically constructed of multiple cells, charge control becomes more challenging. For example, including a charge control mechanism on each cell can become complex and expensive.

Due to manufacturing differences, cell characteristics can vary slightly from cell to cell and cells may not have identical capacities. Therefore, monitoring the voltage and/or temperature of a group of series connected cells may not always enable controlling the charge to the degree of accuracy that would be desired at the individual cell level. The small voltage and/or temperature changes that can occur at the single cell level at the end of charge may be very difficult to monitor in a large series connected battery. This, therefore, places a need for a very high degree of reproducibility in production and in most cases, the need to pretest and match cells of like capacity in the fabrication of multi-cell batteries in order to employ charge control techniques that function adequately. In some cases, individual cell control, monitoring and bypass is used to enable multi-cell batteries to operate satisfactorily.

Furthermore, as multi-cell batteries are fully discharged, gas can be generated in individual cells that may be forced into reversal as a result of differences in capacity from cell to cell. Conventionally, battery terminal voltage can be utilized to discontinue discharge, but this approach has limitations and may lack accuracy in a series connection of multiple cells. Cell pressure may be used to limit charge and over discharge at the cell level. As a result of manufacturing differences, the ideal system would monitor each individual cell's pressure and use that to limit battery charge and discharge. However, this approach involves the monitoring and controlling pressure of each individual cell in a multi-cell battery, which may be complex, expensive and may not be practical for most battery applications.

The approaches described above with respect to the control of battery charge and/or discharge may add considerable complexity and/or cost to batteries that use large numbers of cells.

Therefore, there is a need in the art for simple and reliable techniques to control the charge of multi-cell batteries. Moreover, there is a need to have a reliable simple technique to discontinue battery discharge prior to excessive buildup of cell pressure and cell reversal during discharge.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
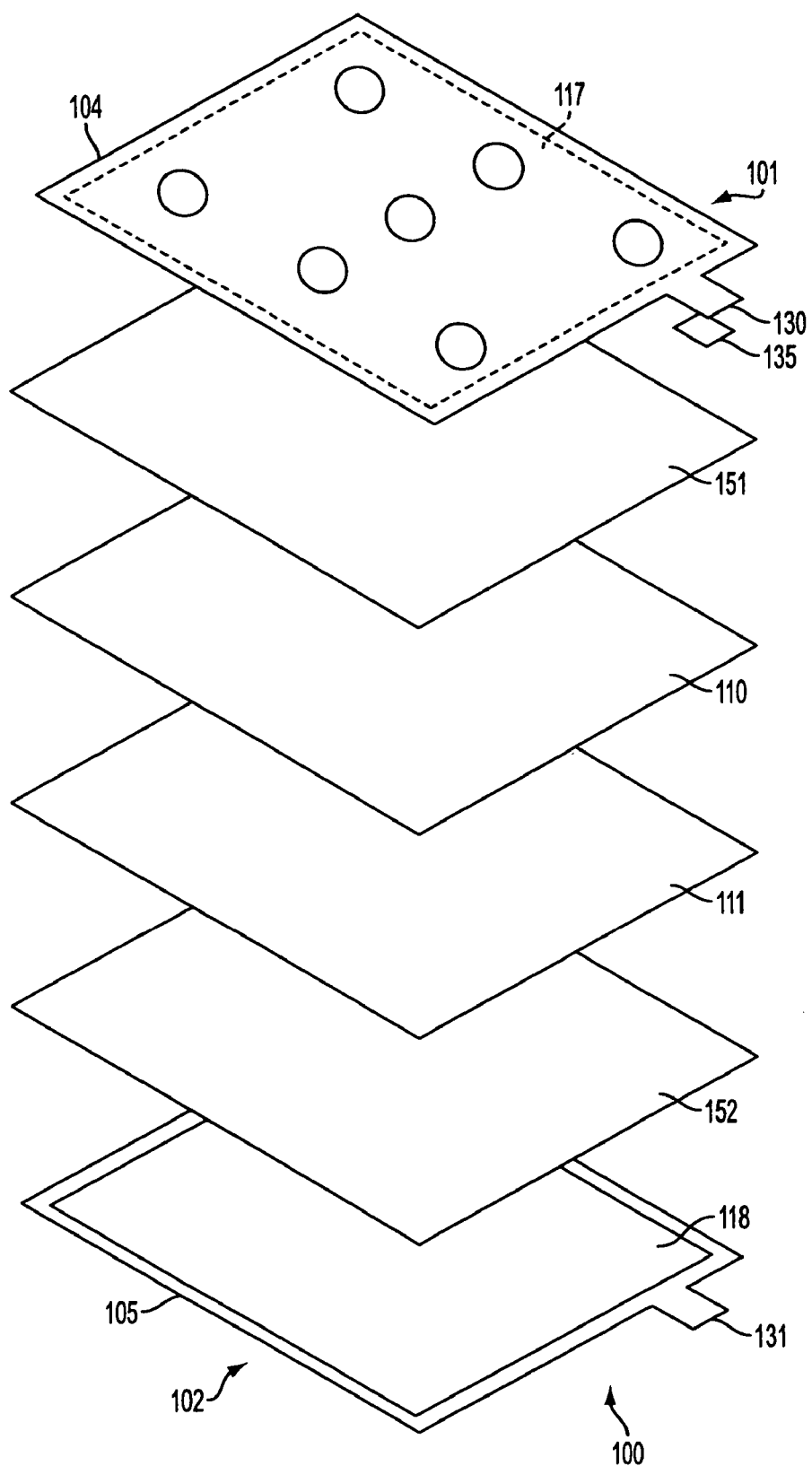
FIG. 1 is a exploded view of a cell in accordance with an embodiment of the present invention.

Embodiments of the present invention provide a method and apparatus for controlling the charge and/or discharge of a multi-cell battery. In one example, the invention may monitor and/or use the pressure that may be generated at the end of charge and/or discharge of a multi-cell battery to control the charge and/or discharge of the battery. The multi-cell battery may include a plurality of re-chargeable cells that may be connected in series to optimize charge input and/or to avoid excessive overpressure of the cells during battery operation.

In embodiments of the present invention, individual bipolar wafer cells may be constructed with, for example, a pressure tab area or the like that can exert a force to trigger a pressure sensitive mechanism when gas pressure is generated within the wafer cell. The pressure tab area may be an area that may expand and generate a force in response to pressure in the wafer cell. In this example, a plurality of cells may be stacked in series and may be aligned using the pressure tab area. In this case, by aligning the pressure tab area of each cell on top of each other, the force generated in any individual cell can be transmitted, via the tabs, through the stack to a pressure triggering mechanism. Therefore, pressure generated in any individual cell as a result of charge and/or discharge may cause the pressure tab area to inflate and/or to exert a force, which may be transmitted to the triggering mechanism. The triggering mechanism may terminate the charge and/or discharge of the stacked wafer cells.

Embodiments of the present invention may relate to an assembly of stacked wafer cells that may have a pressure sensitive flexible tab area. The tab area may be made of a material that may expand in response to pressure. The pressure sensitive flexible tab area may expand and exert a force when pressurized from gas generated within individual cells. The exerted force may activate a calibrated mechanism to generate a signal for charge and/or discharge control.

In embodiments of the present invention, a pressure signal generated from a stack of cells may be utilized to terminate charge and/or discharge, and/or reduce the rate of charge and/or discharge to a lower level. This may allow for programming the charge profile to be most optimum for charge acceptance and thermal consideration. Therefore, very high rates of charge may be tolerable initially until pressure is generated within the cells and then lower and/or pulsing additional charge input may be programmed for optimum charge acceptance and efficiency.

While the following description of embodiments of the present invention is intended to provide detailed structures that would enable one of ordinary skill in the art to practice the invention, the invention is not limited to the specific products or designs details herein provided. Embodiments of the invention as described below describe the invention in detail with respect to showing how certain specific representative embodiments thereof can be made, the materials, apparatus and process steps being understood as examples that are intended to be illustrative only. In particular, the invention is not intended to be limited to the methods, materials, conditions, process parameters, apparatus an the like specifically recited herein.

FIG. 1 shows an exploded view of a single electrochemical wafer cell 100 configured in accordance with an embodiment. It is recognized that a plurality of wafer cells 100 may be stacked and connected to form the multi-cell battery, in accordance with an embodiment of the present invention. The wafer cell 100 may include an outer laminated positive contact face 101, a positive electrode 151, separator layers 110, 111, a negative electrode 152 and an outer laminated negative contact face 102. The outer positive contact faces 101 may include a bonded lamination of thin plastic film 104 and a positive metal foil current collector 117. The outer negative contact faces 102 may include a bonded lamination of thin plastic film 105 and a negative metal foil current collector 118.

In embodiments of the present invention, the thin plastic film layers 104 and 105 may be oversized around the perimeter of the metal foils 117 and 118, respectively. The outer plastic lamination layers 104 and 105 may further incorporate tab extensions 130 and 131, respectively. The tab extensions 130 and/or 131 may be extensions of the cell envelope that may be fabricated into each cell in the stack of cells. The plurality of layers shown in FIG. 1 may be assembled and the perimeter of the plastic films 104 and 105 may be heat sealed to form a sealed compartment for the cell 100. A plastic spacer 135 of, for example, the overall thickness of the electrodes 151 and 152 and separators 110 and 111 may be included in the tab extension 130, 131 of the cell 100 to provide a uniform thickness to the cell 100 and the tab area made up on tabs 130, 131.

Sealed individual cells 100 may be vacuum filled with electrolyte through a fill port for on the top face of the cell, which may then be sealed with a patch. In embodiments of the present invention, a multi-cell stack may be assembled using identical cells 100 that may be stacked on top of each other aligning the contacts and the extended pressure tabs 130, 131 of each cell.

Figure 2:
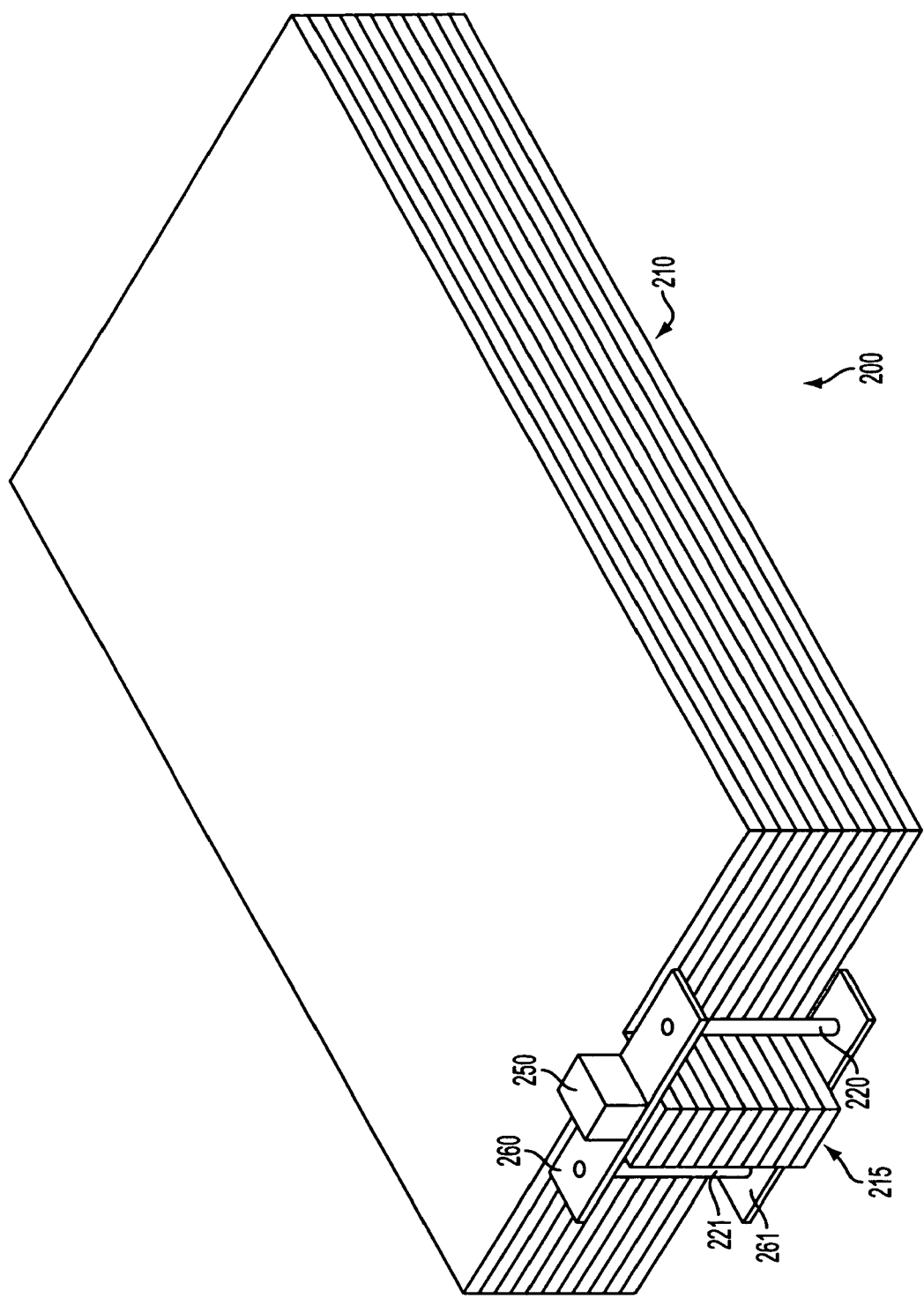
FIG. 2 illustrates a stack of wafer cells in accordance with an embodiment of the present invention.

FIG. 2 illustrates a stacked multi-cell electrochemical battery 200, in accordance with an embodiment of the present invention. As shown, a plurality of cells 210 may be connected in series and stacked on top of each other. The stacked multi-cell battery 200 may include any number of cells such as 1, 2, 5, 10, 19 or more cells. The plurality of cells 210 may include cell pressure tab extensions 215 that may be in contact with each other. In this embodiment of the invention, a metal retainer strip 261 and deflection strip 260 may be anchored by two threaded tie rods 220 and 221 over the pressure tab extensions 215. An electric switch 250 such as a micro-switch may be anchored with a small gap over to the deflection strip 260, as shown in FIG. 2. In embodiments of the present invention, the switch 250 may activate based on, for example, the movement of the metal foil strip 260. Gas generated in any cell in the stack of cells 210 as a result of, for example, overcharge and/or discharge may cause the pressure tab area of extensions 215 of the corresponding cell to expand, thus causing deflection strip 260 to deflect and activate the switch 250.

In embodiments of the present invention, each cell in the plurality of cells may include an area that may expand as a result of pressure built up inside the cell. Corresponding areas of each adjacent cells may be lined up. The force generated by the expansion as a result of the pressure in one cell may be transferred to adjacent cells until it reaches the trigger mechanism such as the deflection strip 260 and/or the switch 250.

Embodiments of the present invention may control a series string of cells thereby reducing battery complexity, added weight and cost to control the battery. Embodiments of the invention may be adapted to the bipolar wafer cell battery stack design concept. The invention may permit the use of broader manufacturing tolerances in cells without adversely effecting battery performance.

Figure 3:
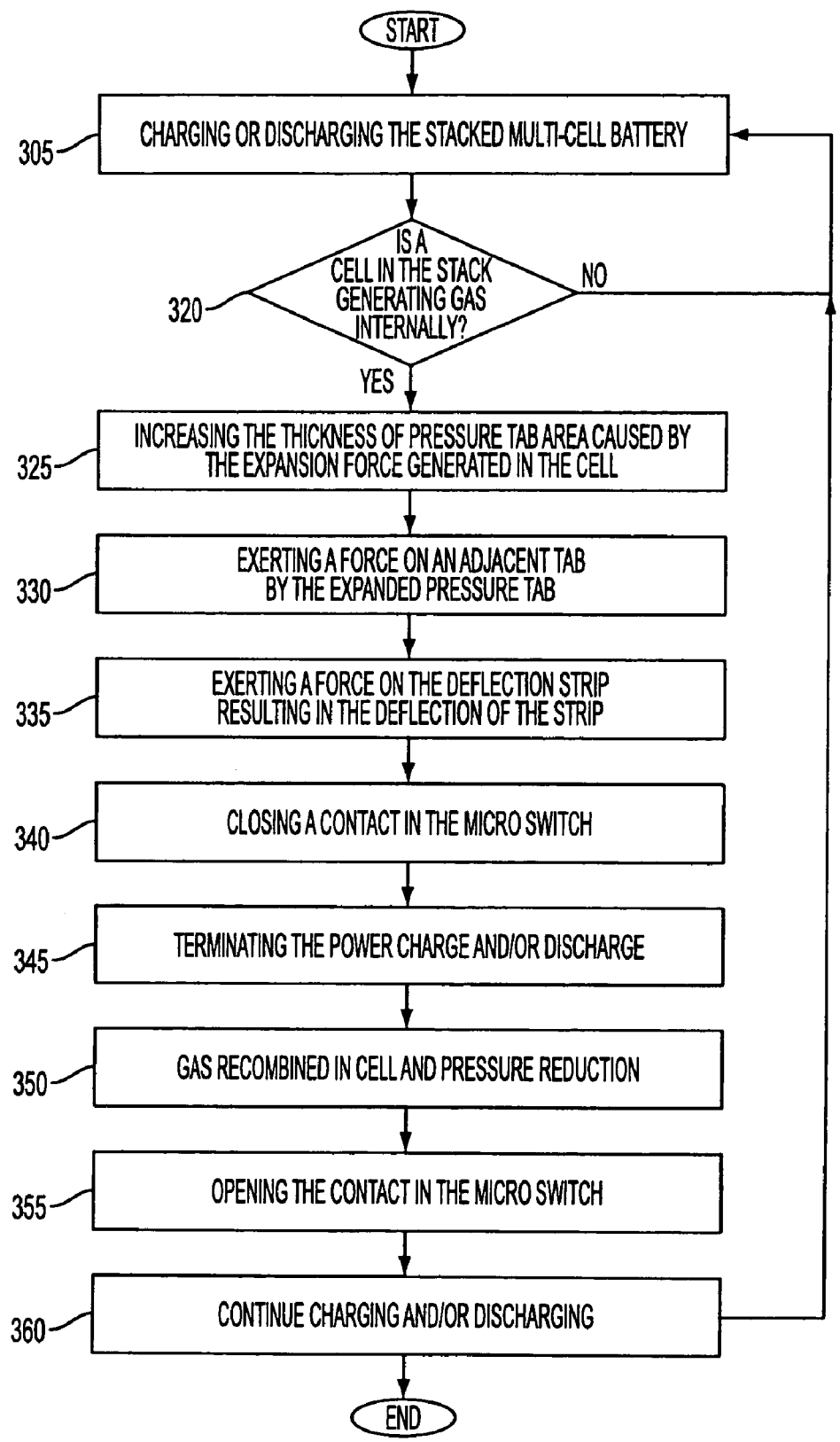
FIG. 3 is a flowchart of a method in accordance with an embodiment of the present invention.

FIG. 3 is a flowchart of a method in accordance with an embodiment of the present invention. In an embodiment of the present invention, the multi-cell battery 200 may be charged and/or discharged, as shown in box 305. If a cell in the stack 200 is generating gas because of being charged too much or discharged too much, an expansion force may be generated in the corresponding pressure tab causing an increase in the thickness of pressure tab area, as shown in boxes 320 and 325. If any cell does not generate gas, continue monitoring the plurality of cells 210 in the stack 200 being charged and/or discharged, as shown in boxes 320 and 305.

As shown in boxes 330, the increase in the thickness of pressure tab area or expansion of the pressure tab in one of the tabs 215 may exert a force on adjacent tab. The force exerted on adjacent tabs by the expanded tab may ultimately exert a force on the metal strip 260 that may cause the deflection strip 260 to deflect, as shown in box 335. The deflection of the strip 260 may cause a contact closure in the switch to occur, as shown in box 340. This contact closure may provide a signal to the battery charger (omitted) to discontinue charging or the equipment using the power to stop discharging the battery, as box 345. It is recognized the deflection strip 260 may cause the contact in the switch to open that may terminate the charging and/or discharging.

In embodiments of the present invention, as the battery 200 sits in the idle mode, the gas that has been generated in the cells may be slowly recombined by the internal recombination reaction in the cell that may result in pressure reduction, as shown in box 350. The reduced pressure may cause the corresponding tab area to contract and the metal foil strip may relax. As a result, the switch may open and signal may be sent to continue charging and/or discharging the battery stack 200, as shown in boxes 355 and 360. In the charge mode, the battery stack 200 may continue to receive small pulses of charge with the charge input cycling on and off as a function of the pressure generation and recombination in any cell in the battery stack 200. In the discharge mode, the battery stack 200 may continue to be discharged with the output cycling on and off as a function of the pressure generation and recombination in any cell in the battery stack 200.

Figure 4:
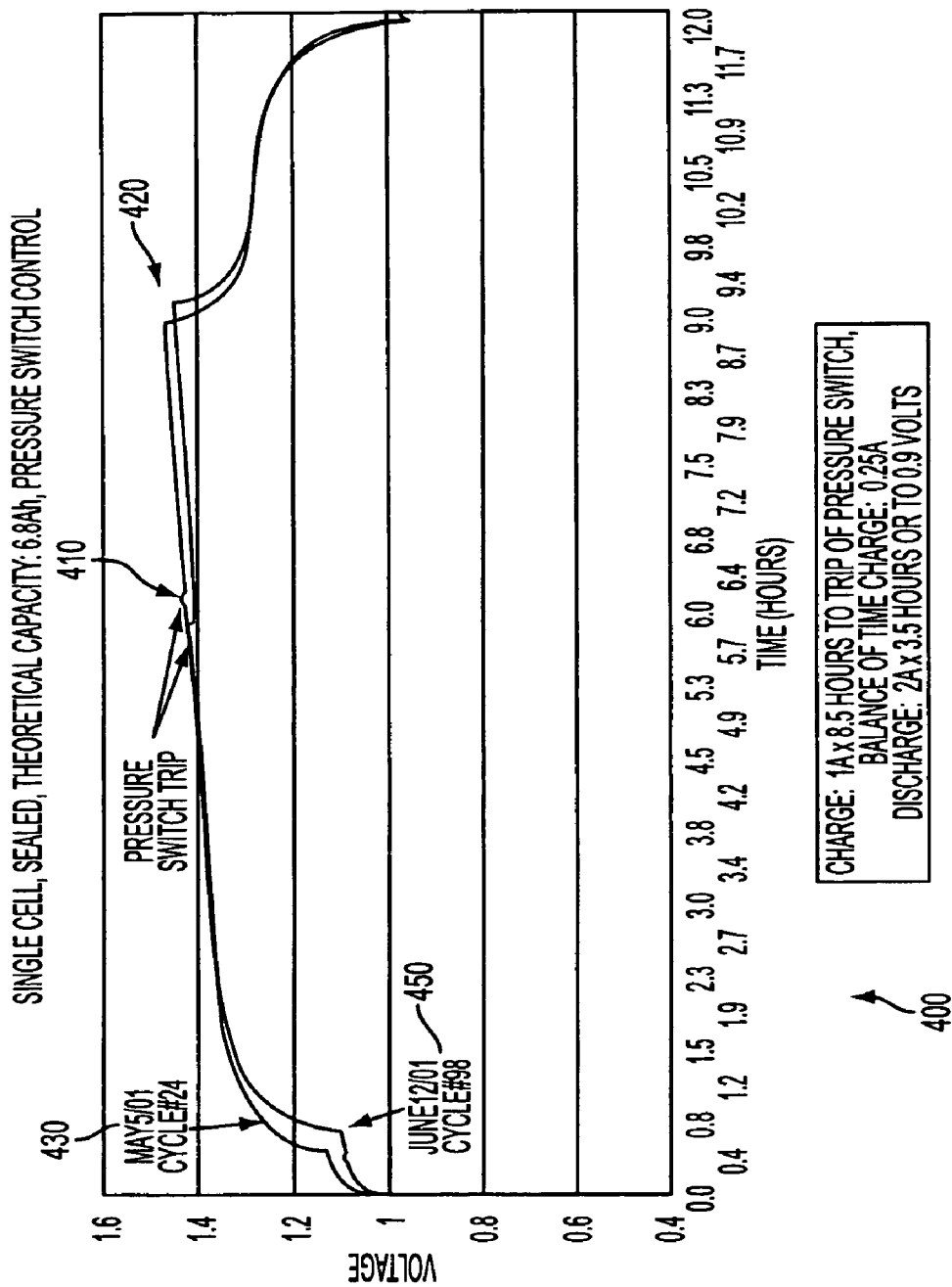
FIG. 4 illustrates the charge and/or discharge test results of a single cell configured in accordance with an embodiment of the present invention.

FIG. 4 shows a voltage vs. time graph 400 of a single-cell electrochemical battery, designed in accordance with an embodiment of the present invention, being charged. Graph 400 shows the charge and/or discharge test results of a single cell that may include a pressure tab control switch. The single-cell battery, as described herein, may be constructed using the single wafer cell 100 as shown in FIG. 1, for example. Details of the stacked wafer cells may be found in U.S. Pat. Nos. 6,503,658, 5,393,617 and 5,552,243, all of which are incorporated herein by reference.

In an embodiment of the present invention, the multi-cell battery or stacked wafer cell may include rolled plastic bonded positive and negative electrodes, separator and foil plastic film laminated face sheets as described in U.S. Pat. No. 6,503,658, for example. In this example, the active electrode area may be 6.8 by 7.4 inches, and the theoretical capacity of the positive electrode may be 6.8-ampere hours with a 25% excess negative electrode capacity. In this example, the outer plastic film layers of the cells may include a pressure extension that is of 0.625×0.625 inches square. A plastic filler spacer, for example, 0.040 inch thick may be inserted between such pressure extensions. The thickness of the filler may be equal to thickness of the electrodes combined with the thickness of the separators. The cell may be heat sealed around the perimeter, filled with electrolyte and assembled with current collector sheets in a frame assembly. A micro-switch of a commercial type with, for example, a spring mechanism, such as one manufactured by Honeywell, Inc. of Morristown, N.J., may be anchored across in the pressure tab extension of the cell.

The active area of the pressure sensitive tab may be approximately 0.5×0.5 inch, which is 0.25 inch square. The spring loaded switch mechanism may be adjusted such that when ten (10) P.S.I. gas pressure is generated within the cell (equivalent to a 2.5 pound force generated by the pressure tab), the micro-switch may trigger to the off position. In this example, the stack may be charged for approximately 8.5 hours at one (1) ampere to the point of pressure switch closure at 410 (shown in FIG. 4), at which time the charger may be reduced to a 0.25 amp level for the balance of 8.5-hour charge. The discharge may be initiated after the charge and may include a constant current two Amperes to an end point voltage of 0.9 Volts at 420 or completion of a 3.5-hour period, which ever came first. As shown in the graph of FIG. 4, the voltage characteristic and pressure trip points of a cell stack on cycle 24 at 430 and cycle 98 at 450 may indicate stable performance and demonstrates the capabilities of the pressure sensing tab mechanism to control the cell charge, in accordance with an embodiment of the present invention.

Figure 5:
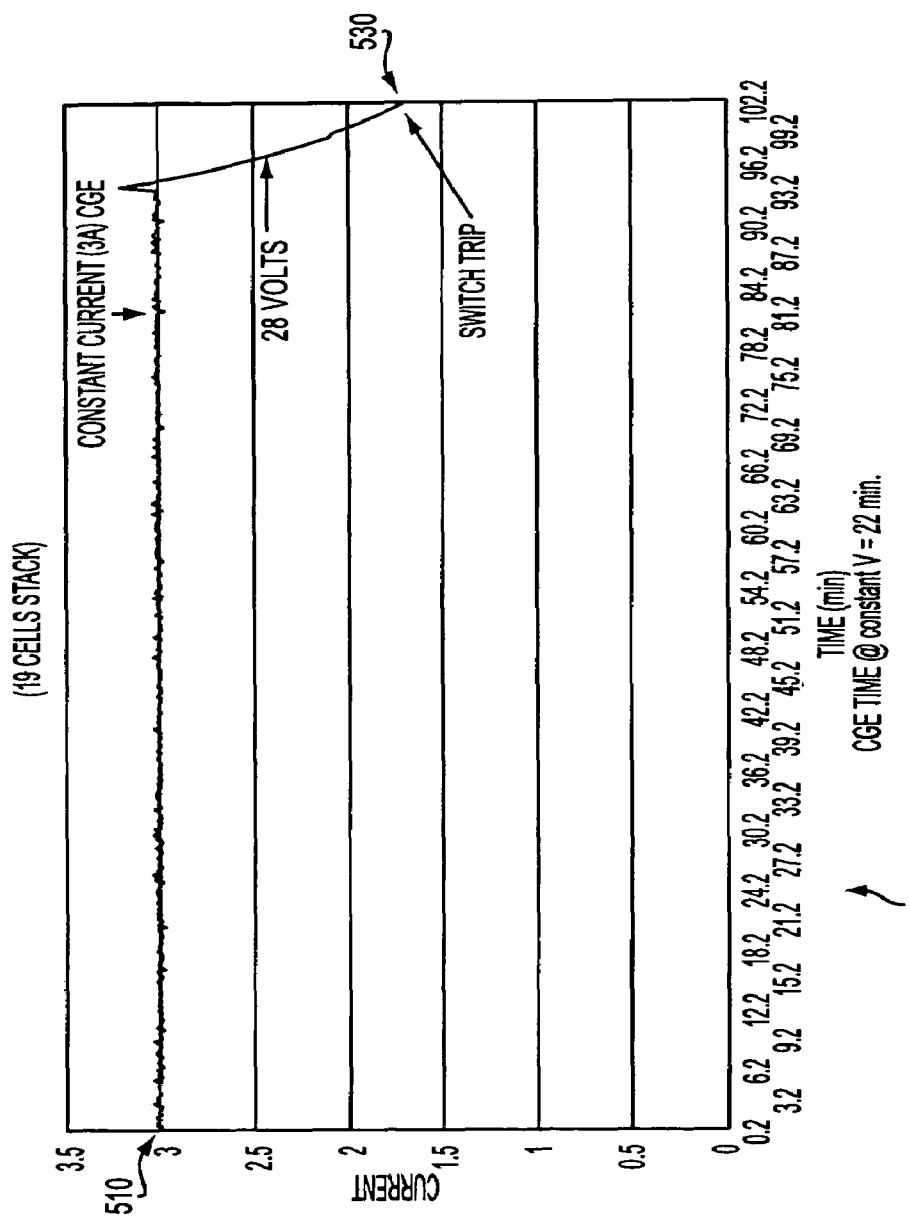
FIG. 5 illustrates a charge profile of a stacked multi-cell battery in accordance with an embodiment of the present invention.

FIG. 5 is a graph 500 illustrating a charge profile of a stacked multi-cell battery in accordance with an embodiment of the present invention. The multi-cell battery may be, for example, similar to the stacked battery 200 shown in FIG. 2 or another type of multi-cell arrangement. As shown in the graph 500, the stacked multi-cell assembly may be charged, for example, at a constant current of three (3) Amperes and then at a constant 28 Volts, as shown at 510. The stacked multi-cell battery may be continue to be charged until pressure generated in at least one of the cells in the multi-cell stack causes a pressure switch mechanism to trip or activate, as shown at 530. Once the switch mechanism trips, the charge being delivered to the multi-cell stack may be discontinued.

Figure 6:
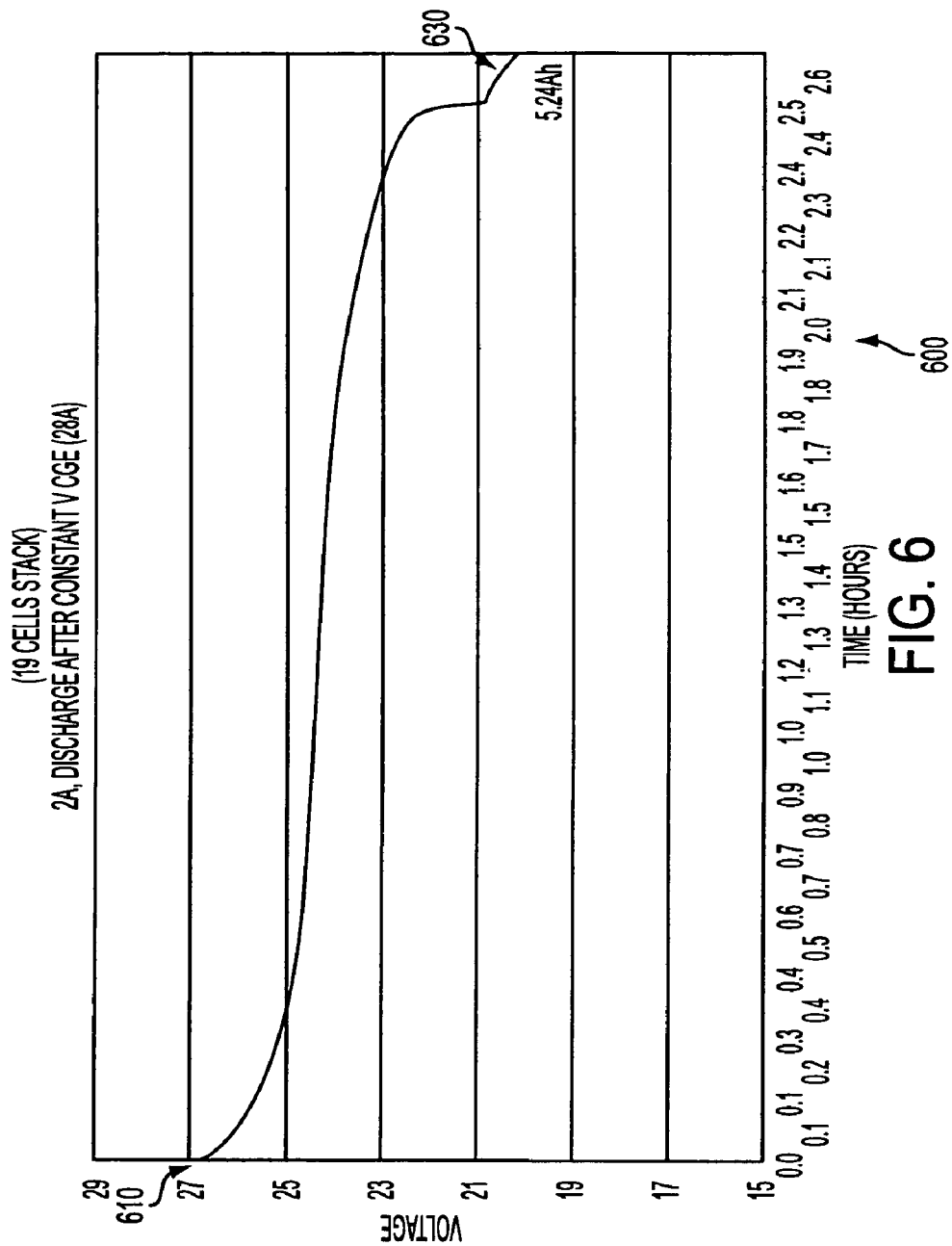
FIG. 6 illustrates a discharge profile of a stacked multi-cell battery in accordance with an embodiment of the present invention.

FIG. 6 is a graph 600 illustrating discharge characteristics of a stacked multi-cell battery in accordance with an embodiment of the present invention. As shown, the stacked multi-cell battery may be charged to approximately 28 Volts. The multi-cell battery may be discharged, for example, at a discharge current of approximately two (2) ampere's to an end point voltage of approximately twenty (20) Volts at which time pressure build up in one of the cells may cause a switch mechanism to trip and discharging of the multi-cell battery may be discontinued, as shown at 630.

Figure 7:
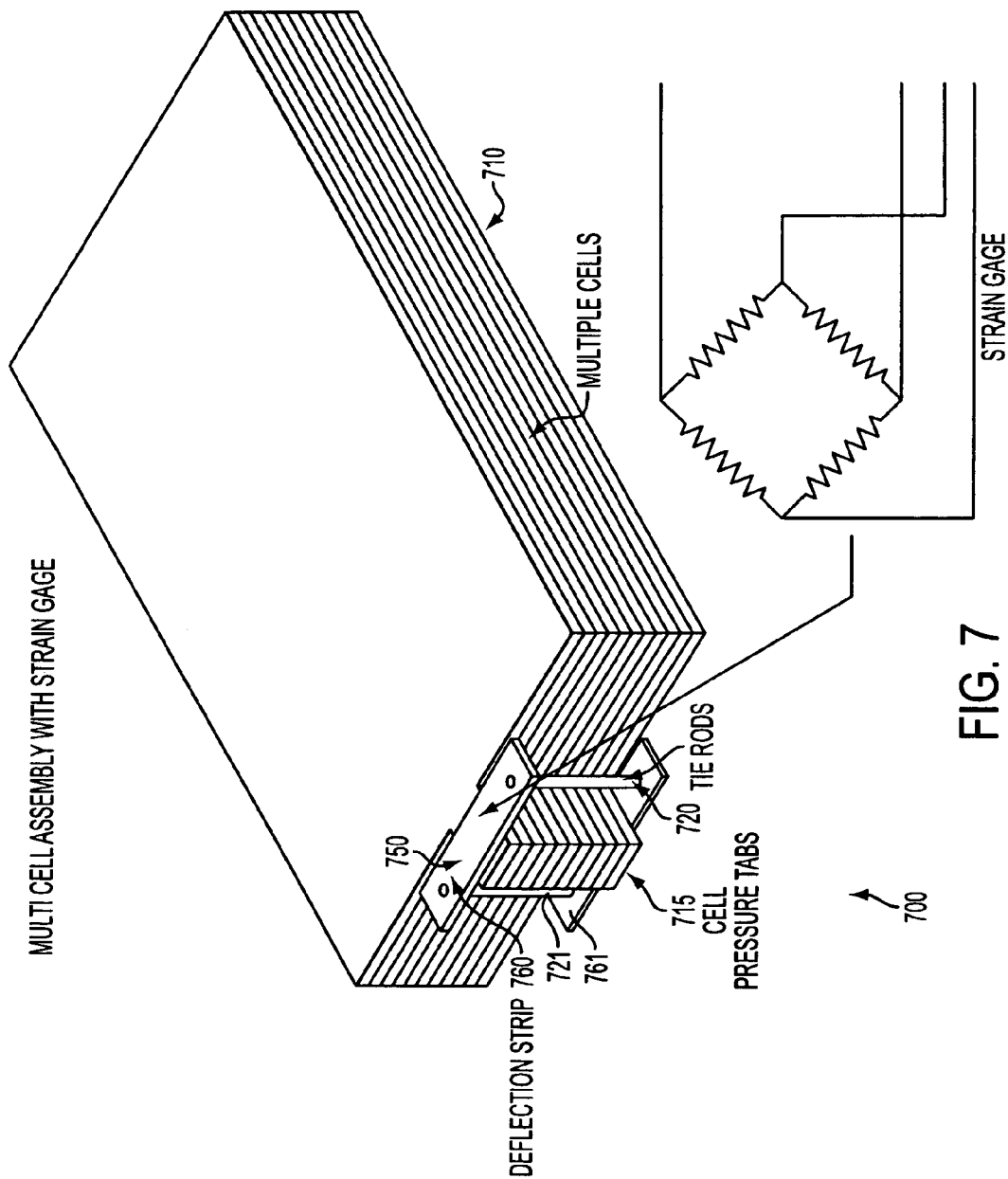
FIG. 7 illustrates a stack of wafer cells in accordance with an embodiment of the present invention.

FIG. 7 illustrates a stacked multi-cell electrochemical battery 700, in accordance with an embodiment of the present invention. As shown, a plurality of cells 710 may be connected in series and stacked on top of each other. The stacked multi-cell battery 700 may include any number of cells such as 1, 2, 5, 10, 19 or more cells. The plurality of cells 710 may include cell pressure tab extensions 715 that may be in contact with each other. In this embodiment of the invention, a metal foil retainer strip 761 and deflection strip 760 may be anchored by two threaded tie rods 720 and 721 over the pressure tab extensions 715. The deflection strip may be a metal foil or the like. In embodiments of the present invention, a strain gauge 750 may be used to signal the battery charge termination and/or discharge termination.

In embodiments of the present invention, the strain gauge 750 may be bonded or coupled to the deflection strip 760. In any case, the pressure build up in any of the cells 710 may cause expansion or deflection of the corresponding pressure tab extension, which may lead to the deflection of the strip 760. The resulting deflections of the pressure tab extensions and the deflection strip 760 may cause characteristics such as resistance of the strain gauge to vary. An output signal from changes in the strain gauge 750 may be used to terminate the battery charge and/or the battery discharge. It is recognized that a cell or group of cells may have multiple pressure sensitive areas such as tabs that may be aligned with adjacent cells and are monitored to measure the change of pressure in one or more cells.

Figure 8:
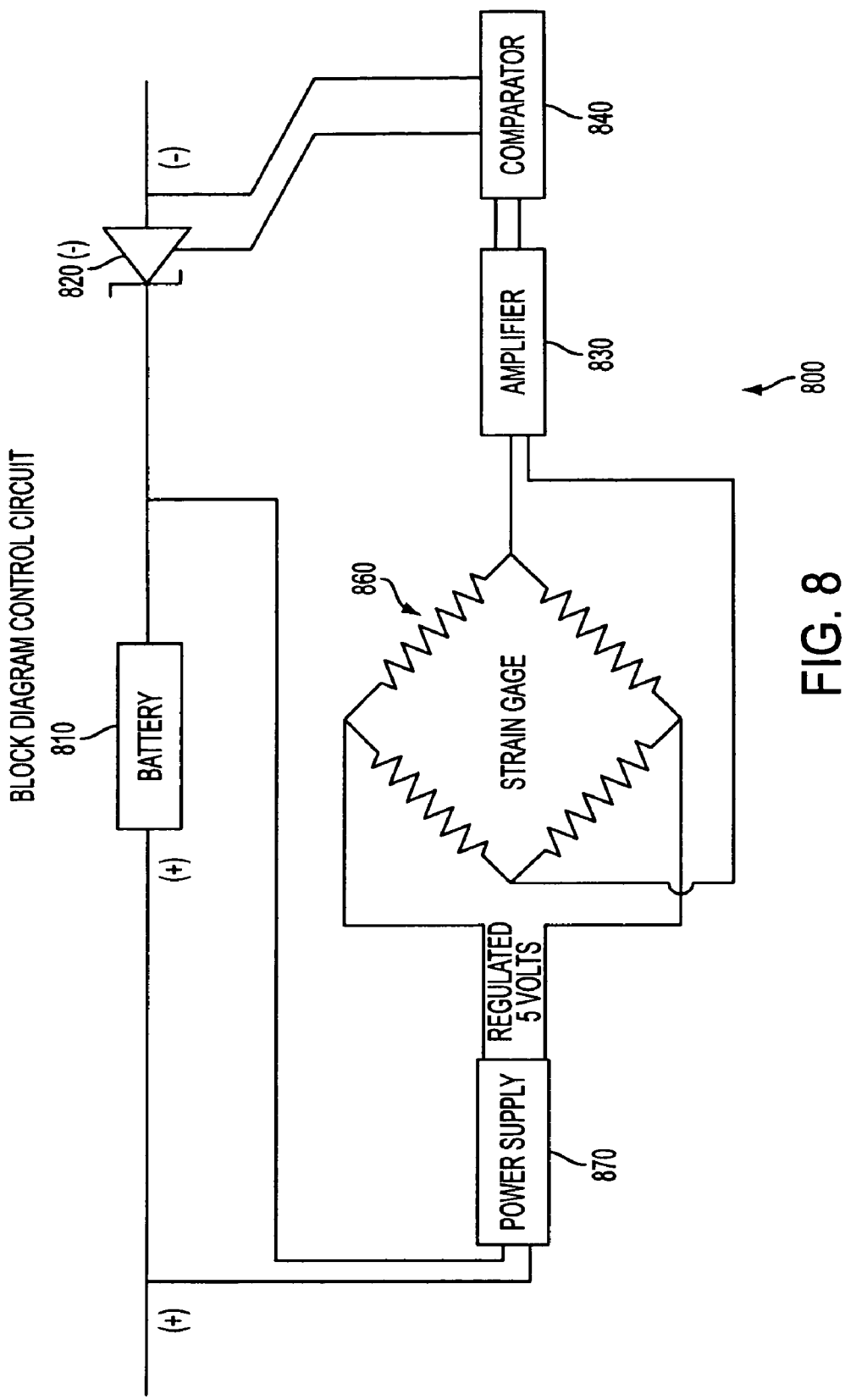
FIG. 8 is a block diagram of a control circuit in accordance with an embodiment of the present invention.

FIG. 8 shows a block diagram of a control circuit 800 that may be used with a strain gauge to control the charge and/or discharge of a stacked multi-cell battery. Circuit 800 shows power supply 870 that may receive auxiliary power from a multi-cell battery 810. The power supply 870 may provide a regulated voltage such as regulated 5 Volts to the strain gauge 860. As shown, the strain gauge 860 may be a Wheatstone type bridge or another type of circuit. Input power may be supplied to one leg of the Wheatstone bridge and the output signal may vary as a function of deflection and/or changes in resistance of the strain gauge 860.

For example, as the characteristics of the deflection strip 760 change, the resistance of the Wheatstone bridge or the voltage across the other leg of the Wheatstone bridge may also change. This reading may be measured on the other leg of the Wheatstone bridge and may be input to an amplifier 830. The amplified measurement output by the amplifier 830 may be input to a comparator 840. The comparator 840 may compare the measured value of resistance or voltage, for example, with a predetermined value. The predetermined value may determine a charge termination and/or discharge termination as a function of internal cell pressure. Thus, strain gauge deflection may be compared with this predetermined value to determine whether charging and/or discharging of multi-cell battery should terminate. The output of the comparator 840 may be used to control a switch 820 that may open, for example, to terminate charging and/or discharging of the stacked multi-cell battery 810. It is recognized that the means for terminating the charging and/or discharging of the stacked multi-cell battery may be a switch, a relay, a solid-state switch, a transistor such as a field effect transistor and/or any other type of switch, trigger mechanism or contact.

Figure 9:
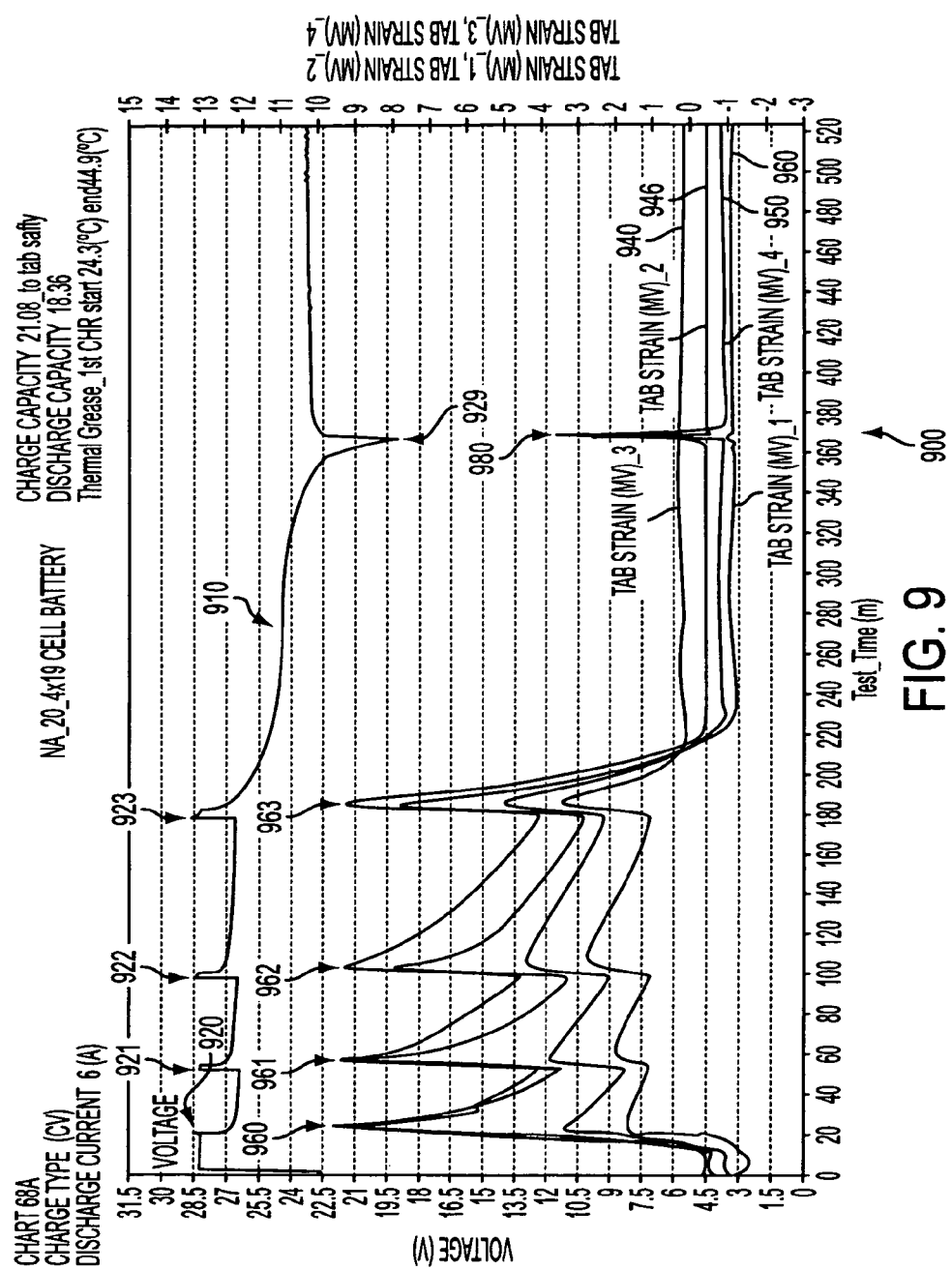
FIG. 9 illustrates a graph of test results from a test performed on a multi-cell battery configured in accordance with an embodiment of the present invention.

FIG. 9 shows a graph 900 showing test results from a multi-cell battery in accordance with an embodiment of the present invention. In this example, a multi-cell battery including four (4) stacks of nineteen (19) cells each with respective strain gauges is used for test purposes to show the strain levels measured from the pressure tabs of the cells. Graph 900 also shows the voltage characteristics of the battery as the charge input is switched based on the measured strain levels. In this example, each pressure tab may be coupled to a strain gauge control mechanism that measures strain or force generated in the tab as pressure builds up in the cell at, for example, full charge and/or discharge. As threshold strain or force on a pressure tab is detected, during battery charge, a switch may open causing the charge to the battery to discontinue. During discharge, individual cell reversal may cause gas pressure in the cell tab area resulting in a strain gauge deflection that may open a switch to terminate discharge. If a threshold strain on a pressure tab is detected, a switch may open causing battery discharge to terminate.

As shown in FIG. 9, traces 940, 946, 950, and 960 may represent the strain measured by the strain gauge attached to each stack of the multi-cell battery. The output strain signal may be measured in the milli-volt (mV) range, as shown in the graph 900. Trace 910 shows the voltage characteristics of the battery as the charge input is switched on and off based on the output strain signals generated from the strain gauge control mechanisms, for example. As peak strain on the pressure tabs is detected as represented by at peaks 960-963, the charge of each multi-cell stack may be interrupted as represented corresponding voltage spikes 920-923. Thus, the pressure signals from the cell pressure tabs, for example, may be used to interrupt the charge of the multi-cell battery. As shown in graph 900, the charge may be reinitiated after a rest during which the pressure of the cell may reduce.

As further shown in graph 900, the generation of gas at the end of battery discharge due to individual cell reversal may cause the measured strain to reach its threshold level as indicated by peak 980. The discharge of the of the multi-cell battery may be terminated as shown by the voltage rise at 929.

Figure 10:
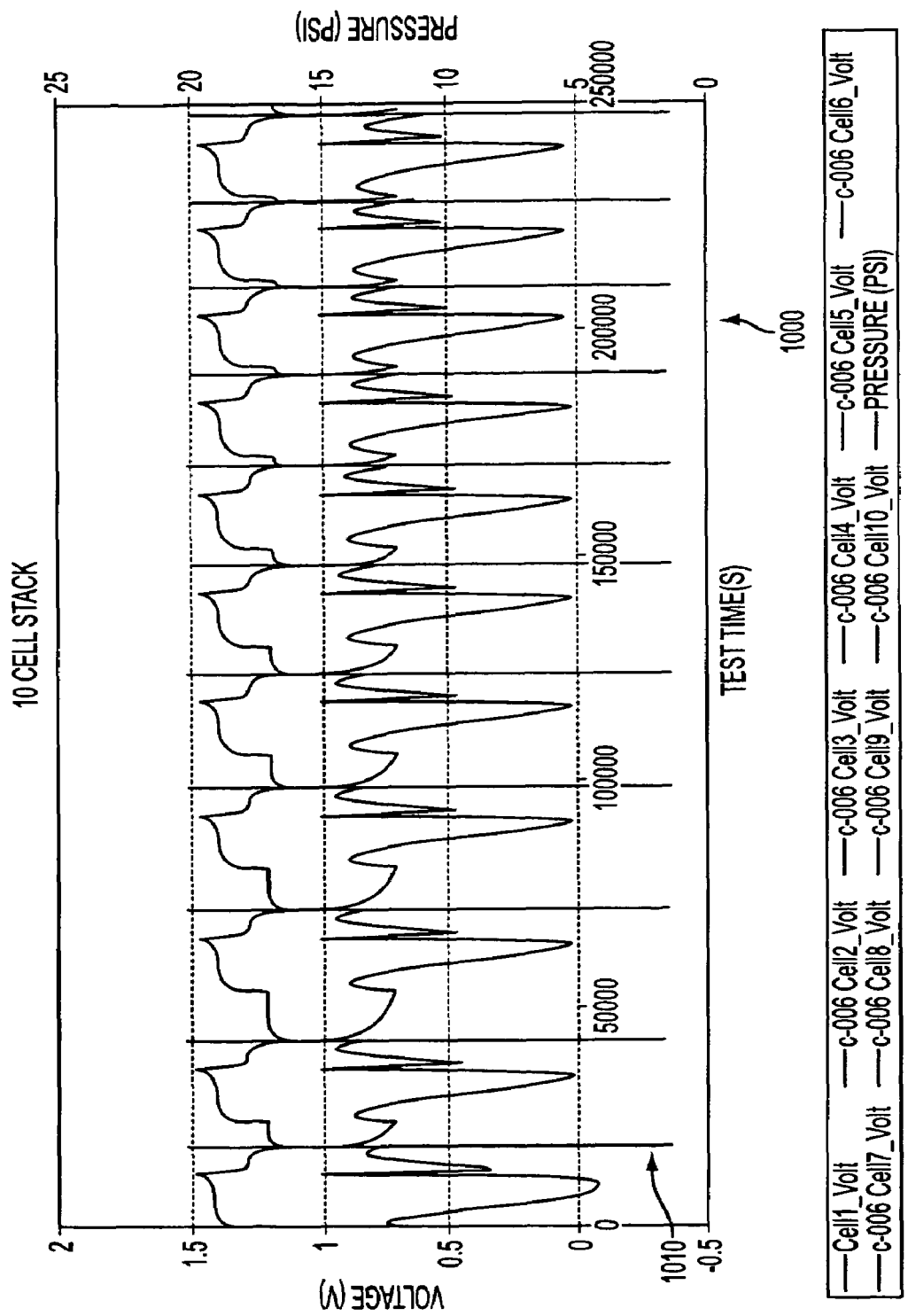
FIG. 10 illustrates a graph of test results from a test performed on a multi-cell battery configured in accordance with an embodiment of the present invention.

FIG. 10 shows a graph 1000 in accordance with an embodiment of the present invention. The graph 1000 shows individual cell voltage of each cell and the pressure characteristics of a ten (10) cell battery stack in accordance with an embodiment of the present invention. Each cell in the 10 cell multi-battery stack may include pressure tab extensions that may be assembled with individual voltage probes between each cell. For example, each electrode may be approximately 9×7 inches and have nominal capacity 5-ampere hour. Voltage probes may monitor individual cell voltages during charge and/or discharge for diagnostic purposes to demonstrate the end of discharge and/or reversal of individual cells.

The multi-cell stack may include a strain gauge mechanism or another type of mechanism such as micro-switch. The 10-cell stack may be subject to a charge discharge profile in which individual cell voltage may be monitored. The output signal from the strain gauge may also be monitored and, in this example, the output signal may be translated into a pressure force generated within the cells. As shown in graph 1000, the strain gauge may respond to pressure generated during charge and at the end of discharge in which one cell. e.g., cell number 3 may be capacity limiting and may go into discharge reversal to −0.4 volts, as shown at 1010. This demonstrates that the reversal of any one cell may generate a strain gauge signal that may be used to terminate discharge.

Figure 11:
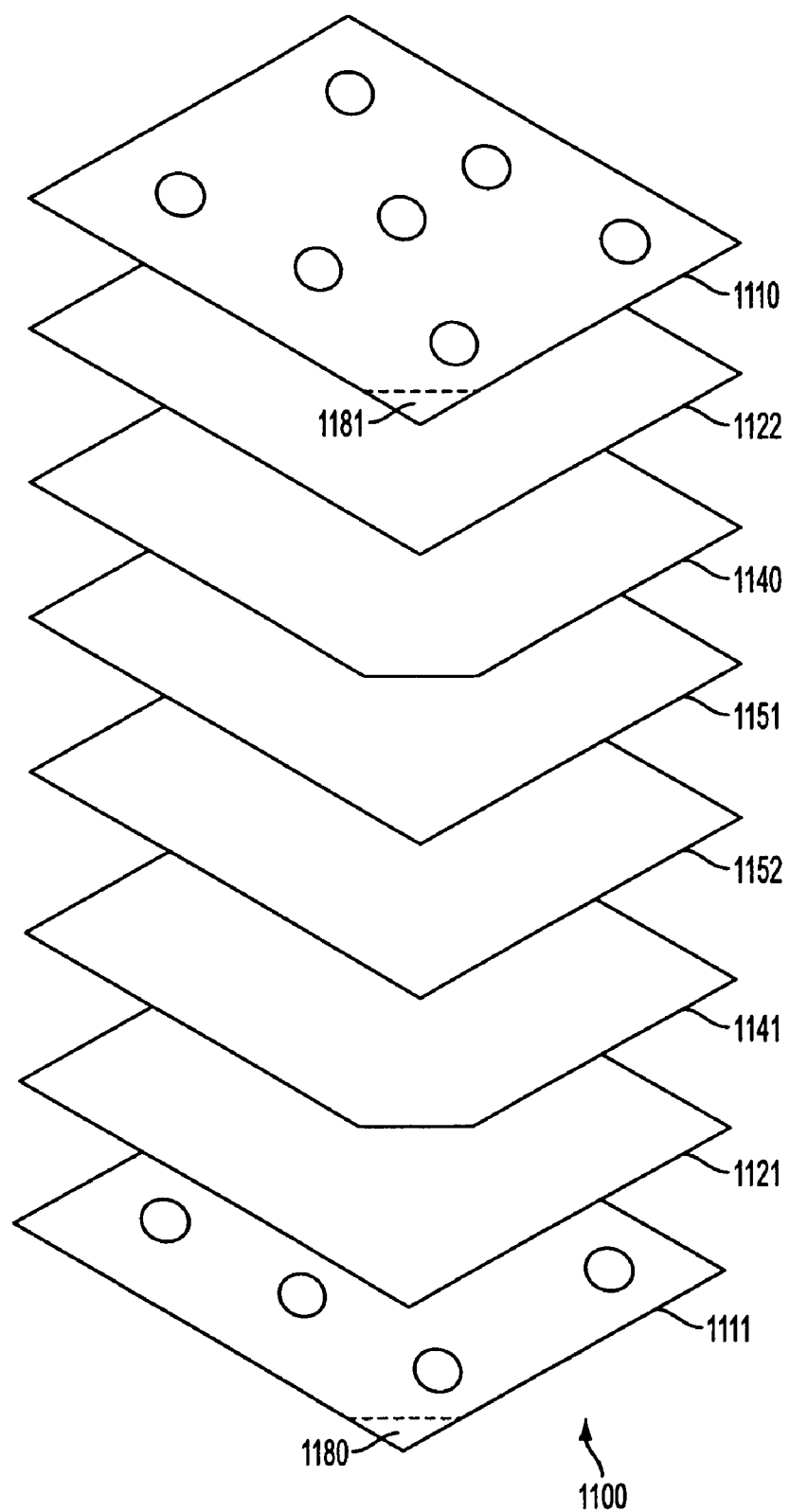
FIG. 11 is a exploded view of a cell configured in accordance with an embodiment of the present invention.

FIG. 11 shows an exploded view of a single electrochemical wafer cell 1100 configured in accordance with an embodiment. As shown, the wafer cell 1100 may include a negative cell cover 1110 with a pressure sensitive tab area 1181 and a positive cell cover 1111 that may have a pressure sensitive tab area 1180. The wafer cell 1100 may further include a negative current collector 1122 and a positive current collector 1121. Sandwiched between the negative current collector 1122 and the positive current collector 1121 may be negative electrode 1140 and positive electrode 1141. The negative electrode 1140 and positive electrode 1141 may be separated from each by separators 1151 and 1152.

As shown in FIG. 11, a small corner of each electrode 1140 and 1141 may be eliminated, for example. The separators 1151 and 1152 may be made of, for example, non-woven porous plastic or other material. The corner of the cell, for example, may be used as the pressure sensing area of the cell. The pressure sensitive area for each cell 1100 may be the bias corner of each cell in the stack of bipolar cells. This configuration may result in a more efficient construction that may utilize less space for the pressure control function. The control mechanism for the corner tabs 1180 and 1181 can be either a micro switch or a strain gauge with associated electronics, as described above. It is recognized that any other area of the cell may be used as the pressure sensitive area. For example, the center of the cell may be tapped to measure the pressure in the cell or cells. Moreover, as described above, it is recognized that a cell or group of cells may have multiple pressure sensitive areas that may be aligned with such sensitive areas of adjacent cells and these areas may be monitored to measure the change of pressure in one or more cells.

Figure 12:
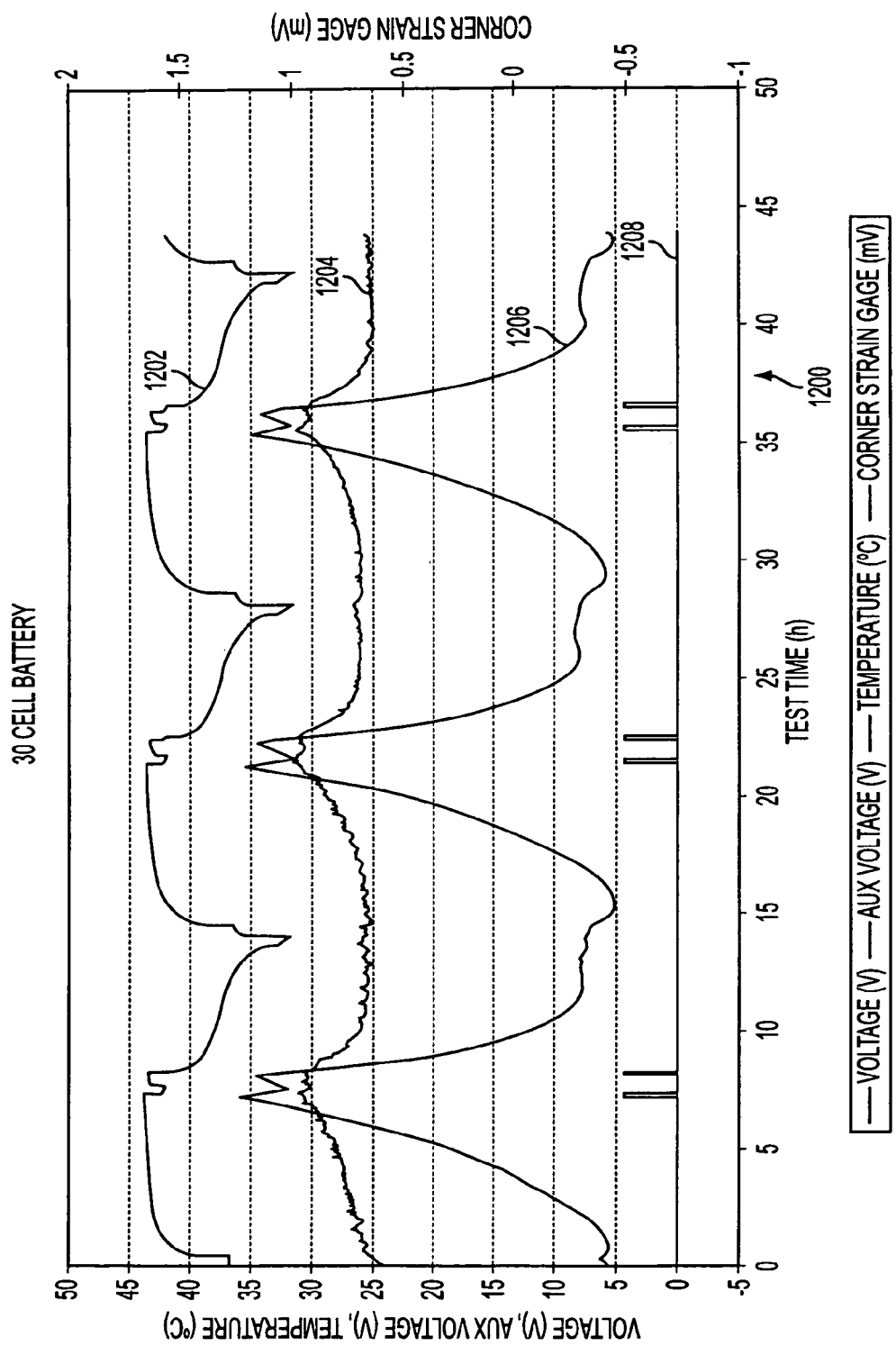
FIG. 12 illustrates a graph of test results from a test performed on a multi-cell battery configured in accordance with an embodiment of the present invention.

FIG. 12 shows a graph 1200 in accordance with an embodiment of the present invention. The graph 1200 shows the voltage characteristics of a cell in a multi-cell stack, for example, a 30 cell battery stack, during charging and/or discharging. Each cell in the 30 cell stack may be configured similar to cell 1100 shown in FIG. 11. The voltage characteristics may be represented by trace 1202. In this example, each cell in the multi-cell stack may include a bias-corner for sensing the pressure change with respect to the cell. The graph 1200 further shows the strain gauge milli-volt signal output 1206 during charging and discharging. The battery temperature is represented by trace 1204 and the output signal of the strain gauge may be utilized to interrupt the charge as represented by trace 1208. In this example, each cell in the 30 cell battery may contain active electrodes that may be 6×12 inches with a nominal capacity of 15 ampere hours. Each individual cell may be assembled with a sequence of face sheets and electrodes and include a bias corner as shown in FIG. 11, for example. The electrode area of the removed triangle or corner may be 0.75 inch on each side and may be represented an area of 0.28 square inches.

In embodiments of the present invention, the 30 cells, for example, may be assembled with a plastic spacer located in the corner between each cell in the cut away electrode area to give a uniform thickness to the stack. The cells may be assembled in a battery housing which may incorporate a bonded strain gauge deflection strip on the bottom of the pressure sensitive cell corner area and or a spring loaded micro-switch located on the top of the cells stack in the pressure sensitive corner area. In embodiments of the present invention, the battery may be placed on a charge and/or discharge test the results of which are shown in FIG. 12. This result demonstrates the capabilities of, for example, the corner pressure sensitive tab area or the bias-corner to control, for example, the 30-cell stack activated either by a micro-switch or a strain gauge element for battery charge control.

Figure 13:
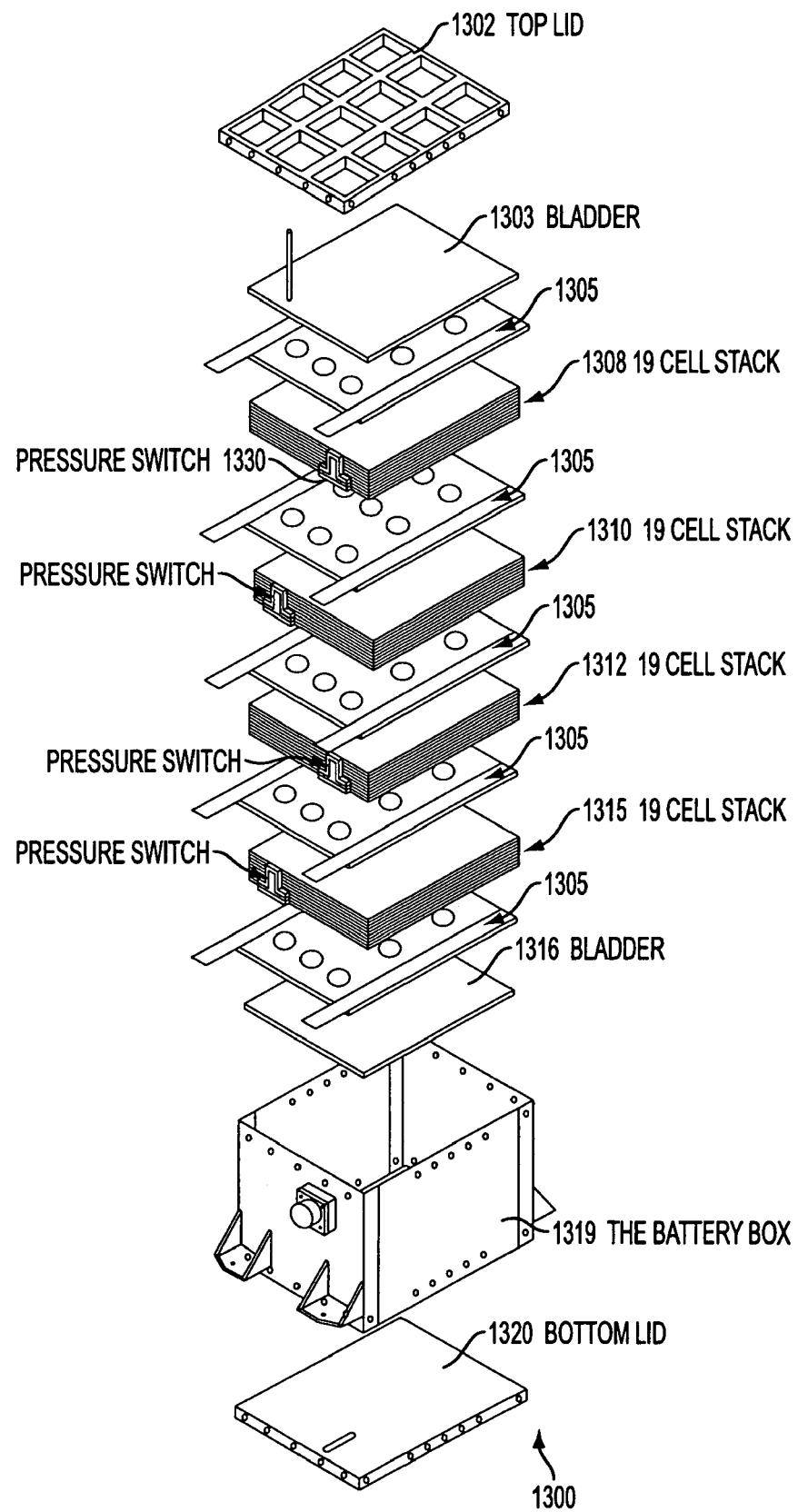
FIG. 13 illustrates an exploded view multi-cell battery system in accordance with an embodiment of the present invention.

FIG. 13 illustrates an exploded view of a battery package 1300, in accordance with an embodiment of the present invention. In this example, the battery package 1300 may include a top lid 1302, a housing 1319 and a bottom lid 1320. The top lid 1302, bottom lid 1320 and housing 1319 may be constructed of aluminum or any other material. The battery package 1300 may include, for example, four (4) 19-cell stack batteries 1308, 1310, 1312 and 1315. It is recognized that any number of cells may be included in each battery and that any number of batteries may be included the battery package. In this example, each cell stack 1308, 1310, 1312 and 1315 may include a pressure switch mechanism on its tab extensions. For example, the pressure switch mechanism 1330 is shown on cell stack 1308 and is included on the tab extension of cell 1308. It is recognized that the cell stack may be of the bias-corner type, as described above. Moreover, one or more cell stacks 1308, 1310, 1312 and 1315 may include strain gauges to measure the pressure with respect to an associated extension tab and/or an associated bias corner.

In embodiments of the present invention, the cell stacks 1308, 1310, 1312 and 1315 maybe assembled in the battery housing 1319 with gas filled bladders 1303 and 1316 at each end. Bladders 1303 and 1316 may be inflatable bladders or other types of bladders. Disposed on either side of the cell stacks 1308, 1310, 1312 and 1315 may be heaters 1305. The cell stacks 1308, 1310, 1312 and 1315 may be electrically wired in parallel with each switch mechanism (e.g., switch 1330) controlling the charge input to each individual stack using appropriate switch configurations. In embodiments of the present invention, a force created by pressure generated in a cell in the stacks 1308, 1310, 1312 and 1315 may be transmitted to the inflatable bladder 1303 and/or 1316 and may used by the inflatable bladder to control a charge or discharge of the battery.

Figure 14:
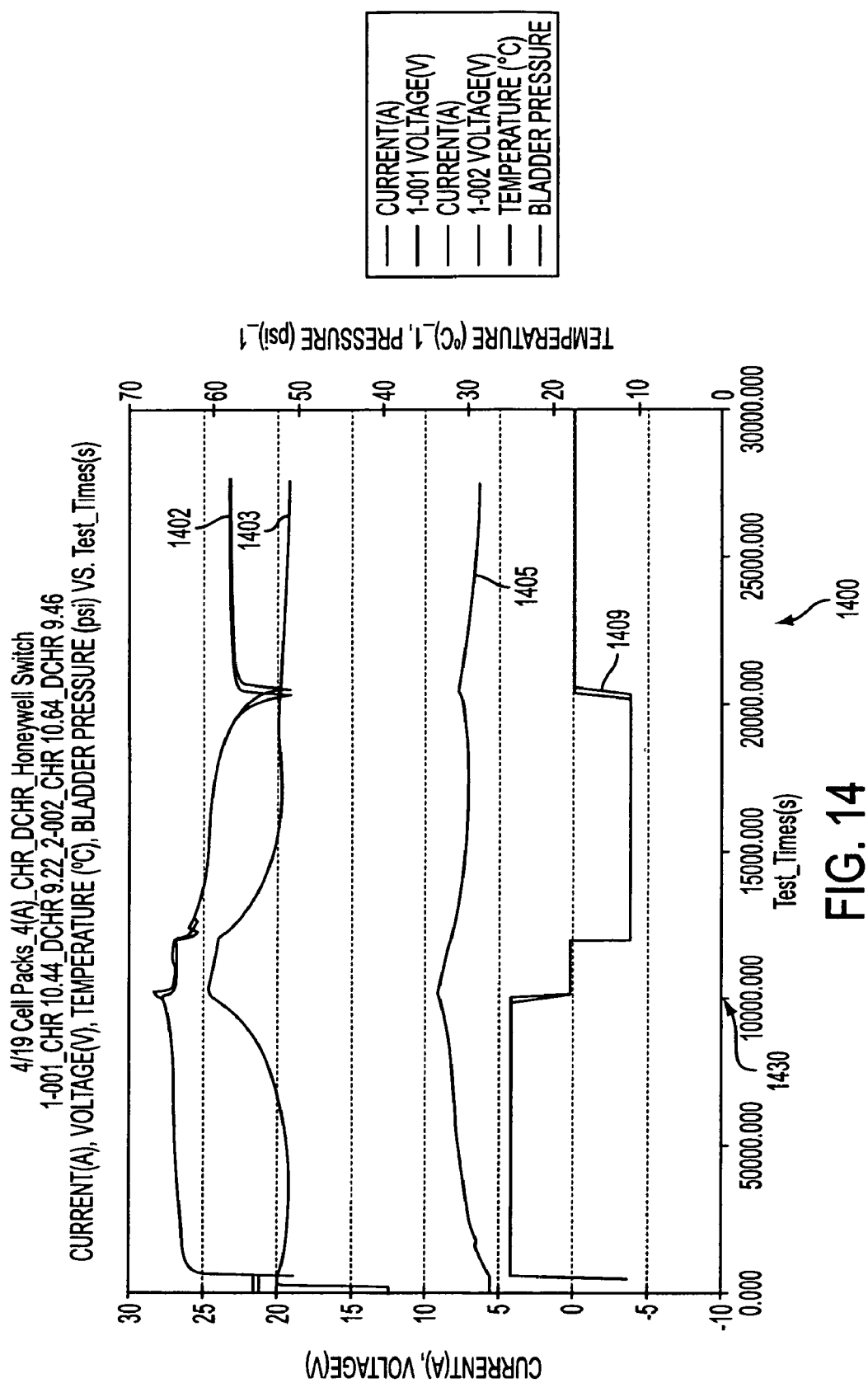
FIG. 14 illustrates a graph of test results from a test performed on a multi-cell battery configured in accordance with an embodiment of the present invention.

FIG. 14 shows a graph 1400 in accordance with an embodiment of the present invention. The graph 1400 shows the voltage, current, temperature and bladder pressure of the battery, for example, battery 1300 when tested on a charge and/or discharge profile. The voltage characteristics may be represented by trace 1402, the current characteristics may be represented by trace 1403, the temperature characteristics may be represented by trace 1405 and the pressure characteristics may be represented by trace 1409, for example. As shown in graph 1400, the charge voltage 1402 and current 1403 may indicate the termination of the charge at approximately the 10,000 second point (as indicated by reference 1430) of charge as the stacks in the multi-cell battery 1300, for example, reach a pressure end point signal and are switching to open circuit. In this example, after the battery has reached the threshold point with respect to charging, a load placed on the battery may cause gradual discharging of the battery 1300. FIG. 14 illustrates the charge control mechanism's capability of independently managing the charge input of a battery, for example, battery 1400 with four parallel stacks.

Embodiments of the present invention may find application in aqueous and/or non-aqueous battery systems that exhibit, for example, the generation of gas pressure within the cells at the end of charge and/or discharge. The examples cited herein are described with reference to cells that utilize, for example, the nickel metal hydride chemistry, but the invention may be applicable to other nickel type batteries such as nickel cadmium, nickel zinc, nickel iron and/or other types of batteries that generate gas pressure in their cells at the end of charge and/or discharge due to electro-chemical or thermal effects.

Manufacturing variations of cells utilized in a multi-cell battery may lead to cells that may not reach a full state of charge and/or discharge simultaneously. Embodiments of the invention may enable controlling a group of cells of the multi-cell battery, that may be arranged in series, by the pressure generated in the first cell in the group of cells that reaches a preset pressure point during charge and/or discharge. Furthermore, if changes in characteristics occur in individual cells during operation as a result of aging and/or temperature variations, the invention may always permit the limiting cell to control battery charge and/or discharge. Embodiments of the present invention may avoid excess pressure generation in individual cells that may cause cell and/or battery failure.

Embodiments of the present invention may provide a reliable technique to monitor and/or use pressure at the individual cell level to control a multi-cell battery. Embodiments of the present invention are directed at a method and apparatus to control the charge and discharge of a multi-cell wafer battery. The techniques and design proposed could also be adapted to classic cylindrical and prismatic battery packaging but is most effectively utilized with the bipolar wafer cell, bipolar battery design.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An electrochemical battery comprising:
 a stack of individually sealed bipolar wafer cells electrically connected in series, the cells being of a chemistry that generates gas in over charge and/or over discharge, each cell being sealed in an envelope having an area to expand in thickness in response to pressure generated within the respective cell, the expandable area of each envelope being aligned with a corresponding expandable area of at least one adjacent cell and containing a spacer providing the cell with a uniform thickness in an unexpanded state; and
 a pressure sensor responsive to a force transmitted through the stack via the expandable areas of the cells, the force to be created by pressure generated in at least one cell in the stack of bipolar cells.

2. The electrochemical battery of claim 1, wherein the pressure sensor is coupled to a cell at the end of the stack of bipolar wafer cells.

3. The electrochemical battery of claim 1, the force is to be created by pressure generated in more than one cell in the stack of bipolar cells.

4. The electrochemical battery of claim 1, wherein each expandable area comprises an extension of the envelope of the respective cell.

5. The electrochemical battery of claim 1, wherein the expandable area of each cell comprises a corner of the cell.

6. The electrochemical battery of claim 1, wherein each cell includes multiple areas to expand in response to pressure generated within the respective cell, each expandable area of each cell being aligned with a corresponding expandable area of at least one adjacent cell.

7. The electrochemical battery of claim 1, wherein the pressure sensor comprises:
 means for deflecting in response to the force to be transmitted through the stack via the expandable areas of the; and
 a switch operatively coupled to the means for deflecting, deflection of the means for deflecting to actuate the switch.

8. The electrochemical battery of claim 1, wherein the pressure sensor comprises a metal strip including a bonded strain gauge, the metal strip to receive the force to be transmitted through the stack via the expandable areas of the cells.

9. The electrochemical battery of claim 8, further comprising:
 a retaining strip; and
 a tie rod coupled to the retaining strip and the metal strip to retain the stack of bipolar wafer cells, the expandable areas of the cells being retained between the metal strip including the bonded strain gauge and the retaining strip.

10. The electrochemical battery of claim 8, further comprises:
 a circuit to power the strain gauge and to generate an output signal as a function of deflection of the strain gauge, the signal to control a flow of electrical current through the stack.

11. The electrochemical battery of claim 10, wherein the circuit comprises:
 a constant voltage power supply, to be powered by power from the stack of bipolar wafer cells, to power the strain gauge;
 an amplifier to increase an amplitude of the signal to be output from the strain gauge;
 a voltage comparator to compare the amplified signal of the strain gauge output with a threshold value; and
 a switch coupled to an output of the comparator, the switch to interrupt current flow through the stack of bipolar wafer cells if the amplified signal of the strain gauge output reaches the threshold value.

12. The electrochemical battery of claim 11, wherein the switch is a relay.

13. The electrochemical battery of claim 11, wherein the switch is a solid state switch.

14. The electrochemical battery of claim 11, wherein the switch is field effect transistor (FET).

15. The electrochemical battery of claim 1, further comprising:
 means for terminating battery charge and discharge based on the force received by said pressure sensor.

16. The electrochemical battery of claim 1, wherein the pressure sensor it to control electrical current flow through the stack to interrupt battery charge or discharge until the force transmitted through the stack via the expandable areas of the cells decreases to a threshold level.

17. The electrochemical battery of claim 1, wherein the pressure sensor is to control electrical current flow through the stack to reduce a rate of charge and discharge to a threshold level.

18. The electrochemical battery of claim 7, wherein the means for deflecting exhibits a spring constant of deflection.

19. The electrochemical battery of claim 18, wherein the spring constant of deflection is adjustable.

20. The electrochemical battery of claim 18, wherein the means for deflecting comprises a metal foil strip or a spring.

21. The electrochemical battery of claim 7, wherein actuation of the switch is to control a flow of electrical current through the stack.

22. The electrochemical battery of claim 1, wherein the pressure sensor comprises:

a switch positioned to receive the force to be transmitted through the stack via the expandable areas of the cells, the force to actuate the switch.

23. The electrochemical battery of claim 22, wherein actuation of the switch is to control a flow of electrical current through the stack.

24. The electrochemical battery of claim 1, wherein the chemistry of each cell is an aqueous chemistry.

25. The electrochemical battery of claim 24, wherein the aqueous chemistry is alkaline.

26. The electrochemical battery of claim 1, wherein the chemistry of each cell is a non-aqueous chemistry.

27. The electrochemical battery of claim 1, wherein the area of each envelope to expand in thickness in response to pressure comprises a flexible material.

28. The electrochemical battery of claim 27, wherein the flexible material is a plastic film.

29. The electrochemical battery of claim 1, wherein the envelope of each cell comprises a flexible material.

30. The electrochemical battery of claim 29, wherein the flexible material is a plastic film.

31. The electrochemical battery of claim 30, wherein within each cell, a positive current collector and a negative current collector, each comprising a metal foil, are laminated to opposing inside faces of the envelope of the respective cell.

* * * * *

UNITED STATES PATENT AND TRADEMARK OFFICE
CERTIFICATE OF CORRECTION

PATENT NO. : 7,244,527 B2 Page 1 of 1
APPLICATION NO. : 10/685473
DATED : July 17, 2007
INVENTOR(S) : Martin G. Klein It is certified that error appears in the above-identified patent and that said Letters Patent is hereby corrected as shown below:

Col. 11, line 67, change "of the; and" to --of the cells; and--.

Col. 12, line 50, change "pressure sensor it to control" to --pressure sensor is to control--.

Signed and Sealed this

Fourth Day of December, 2007

JON W. DUDAS
*Director of the United States Patent and Trademark Office*